(12) United States Patent
Vitse et al.

(10) Patent No.: US 11,142,717 B2
(45) Date of Patent: Oct. 12, 2021

(54) HYBRID BOILER-DRYER AND METHOD

(71) Applicant: General Electric Company, Schenectady, NY (US)

(72) Inventors: Frederic Vitse, West Hartford, CT (US); Steven Unker, Simsbury, CT (US); Carl Edberg, Stafford Springs, CT (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 74 days.

(21) Appl. No.: 16/548,167

(22) Filed: Aug. 22, 2019

(65) Prior Publication Data

US 2020/0299600 A1    Sep. 24, 2020

Related U.S. Application Data

(63) Continuation-in-part of application No. 16/362,140, filed on Mar. 22, 2019, now Pat. No. 10,976,049.

(51) Int. Cl.
| | | |
|---|---|---|
| *C10L 9/08* | (2006.01) | |
| *B01D 53/14* | (2006.01) | |
| *F23B 30/00* | (2006.01) | |
| *F23J 7/00* | (2006.01) | |

(52) U.S. Cl.
CPC ............ *C10L 9/08* (2013.01); *B01D 53/1481* (2013.01); *F23B 7/007* (2013.01); *F23B 30/00* (2013.01); *F23J 7/00* (2013.01); *C10L 2290/08* (2013.01); *F23J 2700/001* (2013.01)

(58) Field of Classification Search
CPC .... F23B 7/007; F23B 30/00; F23J 7/00; F23J 2700/001; F23J 2219/30; F23G 5/30; F23G 5/04
See application file for complete search history.

(56) References Cited

U.S. PATENT DOCUMENTS

| | | | | |
|---|---|---|---|---|
| 4,934,282 A | * | 6/1990 | Asai ........................ | F23C 9/003 |
| | | | | 110/244 |
| 2005/0066864 A1 | * | 3/2005 | Miyoshi .................... | F23G 5/30 |
| | | | | 110/245 |
| 2006/0112588 A1 | | 6/2006 | Ness et al. | |
| 2009/0020405 A1 | * | 1/2009 | Fan .......................... | B01J 19/00 |
| | | | | 201/12 |
| 2011/0023760 A1 | * | 2/2011 | Maghdissian ............ | F23G 5/30 |
| | | | | 110/345 |
| 2019/0093882 A1 | * | 3/2019 | Hughes ..................... | F23J 7/00 |

FOREIGN PATENT DOCUMENTS

| | | |
|---|---|---|
| DE | 354465 A1 | 5/1987 |
| EP | 0501944 A2 | 9/1992 |
| EP | 0851194 A2 | 12/1997 |

OTHER PUBLICATIONS

Corresponding PCT International Search Report and Written Opinion dated Oct. 30, 2020.

\* cited by examiner

*Primary Examiner* — David J Laux
(74) *Attorney, Agent, or Firm* — Grogan, Tuccillo & Vanderleeden LLP

(57) ABSTRACT

A method for reducing the emission of contaminants by a furnace is provided. The method includes forming a bed from a stream of fuel within the furnace; fluidizing the bed with flue gas from the furnace; and heating the fuel within the bed so as to generate char, ash and contaminants. The method further includes capturing the contaminants via the ash.

20 Claims, 7 Drawing Sheets

HYBRID BOILER-DRYER AND METHOD

CROSS-REFERENCE TO RELATED APPLICATIONS

This application is a continuation in part of U.S. patent application Ser. No. 16/362,140, filed Mar. 22, 2019, which is incorporated herein by reference in its entirety.

TECHNICAL FIELD

Embodiments of the invention relate generally to solid fuel boilers and more specifically to a hybrid boiler-fuel dryer and method.

BACKGROUND

In conventional boilers, such as solid fuel boilers, organic materials are commonly used by industry and utilities to generate steam to operate equipment and to generate electricity. For example, electric utility power plants typically generate electric power by using steam to turn the shaft of a turbine to thereby drive an electric generator. Many power plants generate this steam by burning a solid fuel such as coal or biomass fuels. The fuel is burned in a furnace combustion chamber to produce heat that is then used to convert water to steam in a boiler. This steam is then superheated and directed to drive or rotate a steam turbine. The rotating turbines are coupled to alternators by a shaft or rotor to generate AC electricity therewith. After the steam has passed through the turbine, it is provided to a condenser and cooled by passing around pipes carrying cooling water, which absorb the heat from the steam. As the steam cools, it condenses into water which is then pumped back to the boiler to repeat the process of heating it into steam.

Conventional boilers often burn pulverized coal or biomass fuels which may have a high moisture content, for example from being stored outdoors and exposed to high humidity conditions. The moisture content of such high moisture content fuels may vary greatly, thereby introducing consequent variations into the combustion process and making it more difficult to efficiently operate the boilers. (As used herein, the term "high moisture content fuel" is intended to mean and include any type of solid fuel suitable for burning in a furnace). The moisture content of solid fuels is known to have an effect on many aspects of boiler operation, including efficiency and emissions. Boilers burning high-moisture content fuel such as coal will exhibit a relatively low thermal efficiency due to the higher moisture content of the fuel. High moisture content in solid fuels can also lead to problems in areas such as fuel handling, fuel grinding, fan capacity, and flue gas flow rate.

Additionally, in boilers burning high moisture content fuels, efficient suspension or tangential firing is also affected by the relative moisture content and particle size distribution of the fuel. If the moisture content of the fuel is sufficiently high, the combustion of the fuel in the combustion chamber may be slowed or delayed, resulting in unburnt combustible material being carried out with the flue gas. Further, if a particle size of the pulverized solid fuel is sufficiently large, the larger fuel particle size will make it difficult to maintain the fuel particles in suspension in the combustion chamber, thereby reducing the residence time the particle spends at a high temperature to complete the combustion of the entire particle. Accordingly, to achieve desired combustion efficiencies in tangential fired boilers, the high moisture content fuel must be sufficiently dried and sized. Specifically, for efficient combustion in conventional boilers, both the particle size and moisture content of the fuel must be addressed (i.e., minimized) in a fuel pretreatment system. Typically, a drier apparatus is employed prior to combustion to pre-treat (that is, by heating) the high moisture content fuels to reduce the moisture content and enhance the BTU production of the fuel.

Some conventional boilers attempt to circumvent the challenge of combusting fuel having relatively large and moist particles, by employing a semi-suspension system. In such a system, relatively large fuel particles (e.g., greater that 25 mm diameter) are fed to a grate at the bottom of the boiler, while the relatively smaller particles, referred to as "fines" are screened during pretreatment and partially dried in a separate pulverizer drier prior to being fired in suspension. Typically, for conventional semi-suspension systems, a particle moisture content of 55% and a maximum particle size of less than 40 mm is required (90% at <25 mm). Use of these larger particle sizes with higher moisture content fuels typically requires the boiler to be at a heat input of greater than 50% maximum continuous rating (MCR). As used herein, "MCR" is the capability of a steam boiler to produce and provide a predetermined quantity of steam continually and easily without deficit or unwanted effects such as overloading, slagging, or overheating.

However, with fuel pretreatment of moist fuel (for example, to achieve a moisture below 40% (i.e., essentially no surface water) with particle sizes of 96% less than 10 mm, and 99% less than 20 mm), suspension firing at a heat input of more than 10% MCR is feasible, thus making efficient operation at low loads achievable. Additionally, with pulverized and dried fuels, suspension firing is achievable without load limitation for up to 25% moisture content in fuels having particles sized to 85% less than 1 mm. However, such conventional fuel pretreatment results in an undesired and substantial parasitic load on the boiler. For example, while relatively small particle sizes (typically less than 2 mm), a residence time of a few seconds may be sufficient for drying to 20% moisture, for larger particle sizes residence times of minutes may be necessary for effective drying. However, for conventional driers to be economically viable for fuel drying prior to pulverizing, it preferably would have a residence time of few seconds or less so this can be done while the particles are pneumatically conveyed to the furnace. However, the corresponding heat and mass transfer rates in such a drier can typically only be achieved using a fluidizing or entrained reactor with a fuel particle size of 1 mm or less. Achieving such particle sizes with a conventional coal mill has been cost prohibitive in terms of milling power. Additionally, the energy expenditure required to grind the fuel increases significantly as the moisture content of the fuel rises from 20% to 40% and above.

Additionally, coal and/or biomass fuels often contain contaminants, i.e., gaseous elements and/or chemicals that cause corrosion, fouling, slagging and/or are otherwise undesirable within a boiler and/or surrounding environment, which are emitted upon firing of the fuels in a furnace.

What is needed, therefore, is a hybrid boiler-dryer method for reducing the emissions of contaminants by a furnace.

BRIEF DESCRIPTION

In an embodiment, a method for reducing the emission of contaminants by a furnace is provided. The method includes forming a bed from a stream of fuel within the furnace; fluidizing the bed with flue gas from the furnace; and heating the fuel within the bed so as to generate char, ash and contaminants. The method further includes capturing the contaminants via the ash.

In another embodiment, a furnace is provided. The furnace includes a grate operative to form a bed from a stream of fuel, and a conduit operative to fluidize the bed with a flue gas generated by the furnace. The bed facilitates: generation of char, ash and contaminants from the fuel; and capture of the contaminants by the ash.

In still yet another embodiment, a non-transitory computer readable medium including instructions is provided. The instructions adapt at least one processor to: adjust at least one property of a bed formed by a stream of fuel within a furnace to facilitate: generation of char, ash and contaminants from the fuel; and capture of the contaminants by the ash.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
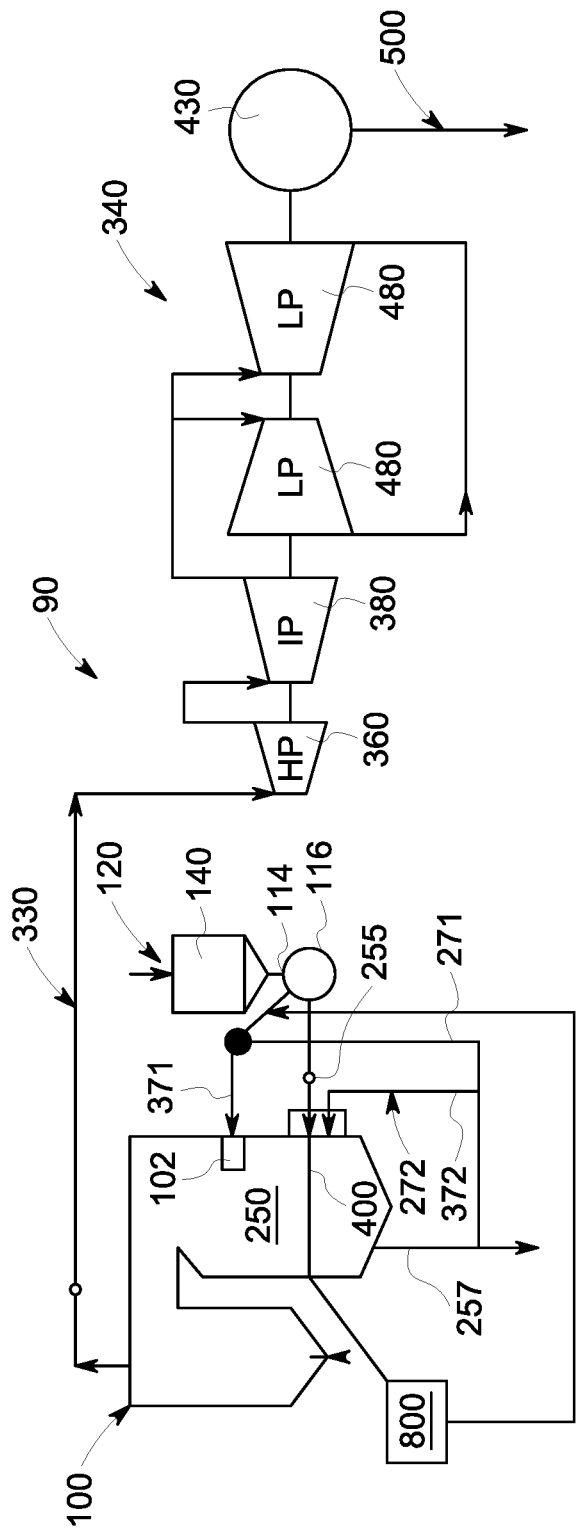
FIG. 1 is a schematic diagram of an embodiment.

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate Conditions within reasonably achievable manufacturing and assembly tolerances, relative to ideal desired conditions suitable for achieving the functional purpose of a component or assembly. The term "real-time," as used herein, means a level of processing responsiveness that a user senses as sufficiently immediate or that enables the processor to keep up with an external process. As used herein, "electrically coupled," "electrically connected," and "electrical communication" mean that the referenced elements are directly or indirectly connected such that an electrical current, or other communication medium, may flow from one to the other. The connection may include a direct conductive connection, i.e., without an intervening capacitive, inductive or active element, an inductive connection, a capacitive connection, and/or any other suitable electrical connection. Intervening components may be present. As also used herein, the term "fluidly connected" means that the referenced elements are connected such that a fluid (to include a liquid, gas, and/or plasma) may flow from one to the other. Accordingly, the terms "upstream" and "downstream," as used herein, describe the position of the referenced elements with respect to a flow path of a fluid and/or gas flowing between and/or near the referenced elements. Further, the term "stream," as used herein with respect to particles, means a continuous or near continuous flow of particles. As also used herein, the term "heating contact" means that the referenced objects are in proximity of one another such that heat/thermal energy can transfer between them.

While the embodiments disclosed herein are primarily described with respect to solid fuel boilers, it is to be understood that embodiments of the present invention may be applicable to other apparatus and/or methods that benefit from the teachings herein. While coal as a fuel fired in the boiler furnace of an electric power plant shall generally be referred to herein as an exemplary particulate material for purposes of this application, it will be appreciated that any other solid material that constitutes a useful or beneficial input to an industrial operation may be used as well.

Referring to FIG. 1, a schematic diagram of an embodiment of a solid-fuel type power plant 90 for the generation of electricity is shown. The power plant 90 is operative to increase the temperature and pressure of a gas to drive one or more turbines. The rotating turbines are coupled to alternators by a shaft or rotor to generate AC electricity therewith.

The power plant 90 includes a boiler 100 which includes a furnace 250 configured to burn a solid fuel 120 therein. As will be described in more detail herein, the solid fuel 120 in particulate form is fed from a storage area 140 such as a coal bunker to the boiler 100 in which it is combusted to produce heat.

The furnace 250 is operative to ignite and combust the solid fuel 120 in a known manner. For example, in an embodiment, the boiler 100 may employ a conventional firing system 102 such as a suspension firing system to combust the fuel 120. Other embodiments may include other types of conventional furnace firing systems 102 without departing from the scope of the claims herein. In some embodiments, the furnace 250 may include a conventional back-pass portion 252 (FIG. 2).

Figure 2:
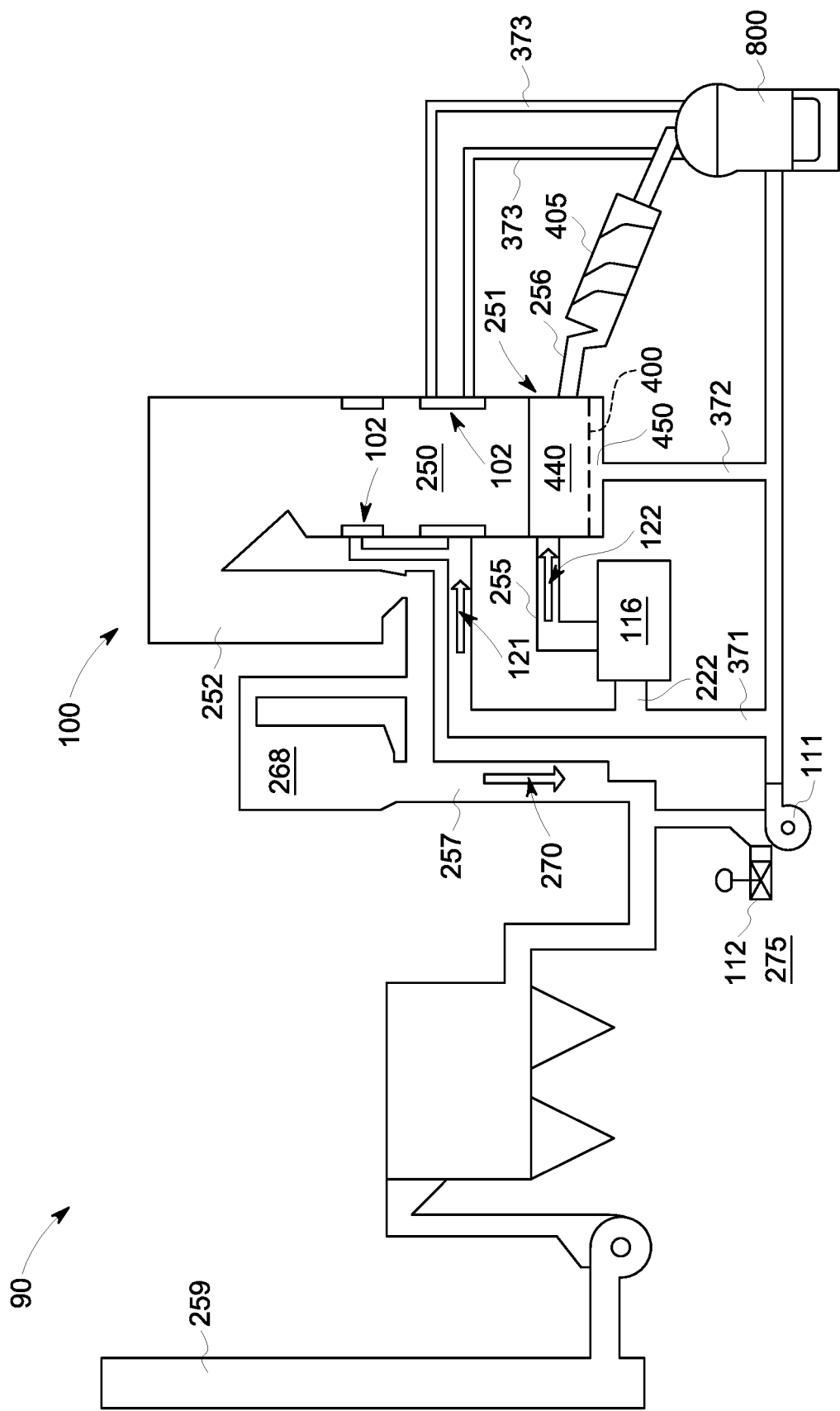
FIG. 2 is a schematic diagram of an alternative embodiment.

As depicted in FIG. 2, during operation, a relatively hot flue gas 270 is produced by the combustion of the fuel 120 (FIG. 1) in the furnace 250 and provided to a flue 257 and vented therefrom, for example via an exhaust stack 259. In various embodiments, flue 257 may be defined by one or more ducts arranged to receive the hot flue gas 270 produced in furnace 250. As described in more detail herein, at least a first portion 271 (FIG. 4) and a second portion 272 (FIG. 4) of the hot flue gas 270 may be extracted from the flue 257 and recycled to enable the operation of the various embodiments described herein.

Figure 4:
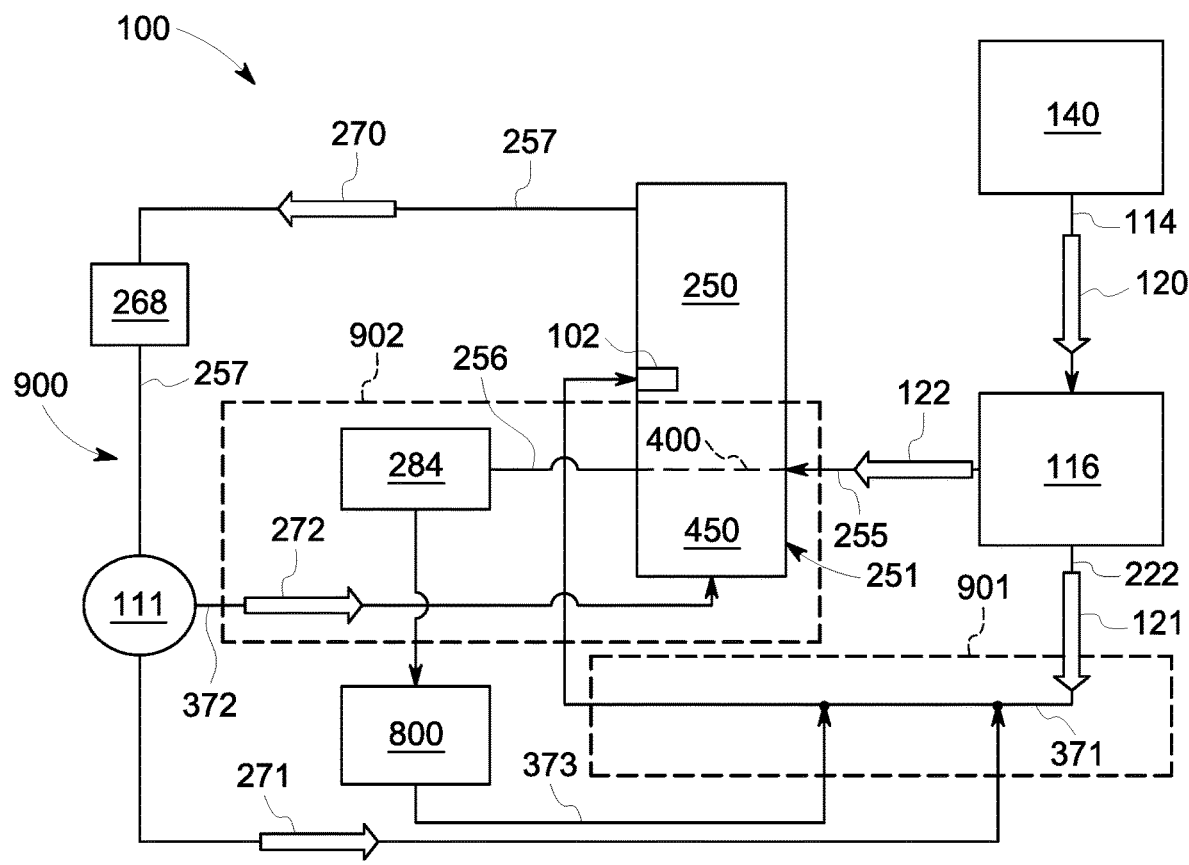
FIG. 4 is a schematic diagram according to an embodiment.

Additionally, as depicted in FIG. 4, in some embodiments, one or more pollution control devices may be arranged to receive the hot flue gas 270 from the flue 257. For example, a scrubber 268, such as a conventional wet scrubber, may be arranged in fluid communication with the flue 257 to receive the flue gas 270 therefrom to extract pollutants such as sulfur compounds, oxides of sulfur (e.g., sulfur dioxide) and ash particles from the flue gas 270 prior to extracting and recycling the first and second portions 271, 272 of the flue gas 270.

The boiler 100 further includes a hybrid boiler-dryer 900. As shown, embodiments of the hybrid boiler-dryer 900 include a first fuel dryer 901, and a second fuel dryer 902. In an embodiment, the first fuel dryer 901 may include in-suspension fuel dryer, and the second fuel dryer 902 may include an on-grate fuel dryer. As used herein the term, "fuel dryer" means any apparatus that is useful for the reduction of the moisture content of a particulate material through the application of direct or indirect heat, including but not limited to a fluidized bed dryer, vibratory fluidized bed dryer, fixed bed dryer, traveling bed dryer, cascaded whirling bed dryer, or elongated slot dryer.

During operation, as shown in FIG. 1, the heat produced by the normal combustion reaction of burning fuel 120 within the furnace 250, in turn, heats and converts water in tubes (not shown) into steam 330, which is delivered to steam turbine 340. In some embodiments, steam turbine 340 may include a plurality of turbines, such as a high-pressure steam turbine 360, intermediate-pressure steam turbine 380, and low-pressure steam turbines 480 operatively connected in series. The steam 330 performs work by pushing against the fanlike blades (not shown) connected to a series of wheels (not shown) contained within each turbine 340, 360, 380 which are mounted on a shaft (not shown). As the steam 330 pushes against the blades (not shown), it causes both the wheels and turbine shaft to spin. This spinning shaft turns the rotor of electric generator 430, thereby producing electricity 500. Steam 330 leaving the steam turbine 360 is delivered to condenser (not shown) in which it is cooled by means of cooling water to convert the steam back into water.

In the embodiment depicted in FIGS. 2 and 4, the solid fuel 120, (such as relatively high-moisture content raw coal), may be collected in the storage area 140 (FIG. 1) such as a coal bunker until needed. The high-moisture content fuel 120 may include a first portion 121 of fuel (as indicated in FIG. 4 by arrow 121) defining relatively small particle sizes, or "fines" (e.g., less than 25 mm diameter), and a second portion of fuel 122 (as indicated in FIG. 4 by arrow 122) defining relatively large particle sizes, that are coarser or larger (e.g., at least 25 mm diameter) than the relatively fine or small particle sizes defined by the first portion 121. In an embodiment, the first portion of fuel 121 further defines predetermined particle sizes that are appropriate for burning by the firing system 102 without need of milling or other steps to reduce the particle sizes within the first portion of fuel 121; and the second portion of fuel 122 defines predetermined particle sizes that need milling or other steps to reduce the particle sizes within the second portion of fuel 122 to enable burning by firing system 102.

During operation, the raw fuel 120 is provided or conveyed using a conventional conveyor device 114 to a filter or sieve 116 for screening. The sieve 116 is operative to separate the first portion of fuel 121 from the second portion of fuel 122 based on the relative particle sizes of the first and second portions of fuel 121, 122. In various embodiments, the sieve 116 may include a roller screen. In other embodiments, the sieve 116 may include one or more of a centrifuge, trammel screener, vibratory screener, screw feeder, and rotating drum feeder. In other embodiments, any desired sieve 116 device may be used to separate the first portion of fuel 121 from the second portion of fuel 122 that enables the furnace to operate as described herein without departing from the scope of the claimed subject matter.

Once the first portion of fuel 121 is filtered or separated from the second portion of fuel 122 by the sieve 116, the first portion of fuel 121 may then be provided to the firing system 102 of furnace 250 for burning via the first fuel-dryer 901. In an embodiment, the first fuel-dryer 901 include a first channel or duct 371 through which the first portion of fuel 121 is conveyed by a flow of the first portion of the flue gas 271. For example, in an embodiment, the first duct 371 is configured to receive the first portion of coal 121 directly from the sieve 116. In other embodiments, the first duct 371 is configured to receive the first portion of coal 121 from a first conveyor 222 such as a pressurized duct coupled in fluid communication therebetween the first duct 371 and the sieve 116. In other embodiments, the first conveyer 222 may be a mechanical type first conveyor 222 such as a belt conveyor or chute, or any other conventional conveyor that enables the first portion of coal 121 to be received by the first duct 371 from sieve 116. Additionally, the first duct 371 is arranged in fluid communication with the flue 257 to receive the first portion of the flue gas 271 therefrom. The first portion of the flue gas 271 flows through the first duct 371 to thereby convey the first portion of fuel 121 therethrough to the furnace 250 for burning by firing system 102. The first portion of flue gas 271 may be provided using a first air fan 111, such as a primary air fan, in fluid communication with first duct 371. In some embodiments, the first air fan 111 may include a flue gas recirculation fan.

In this way, in the first fuel dryer 901, including the first duct 371, the heat from the recycled first portion of flue gas 271 is advantageously used to further dry the first portion of fuel 121 while in suspension within the first duct 371 prior to combustion in the furnace 250, for example by suspension or tangential firing.

Once the second portion of fuel 122 is filtered or separated from the first portion of fuel 121, the second portion of fuel 122 may be further dried and sized before being provided to the firing system 102 for burning in furnace 250. The second portion of fuel 122 is dried by the second fuel dryer 902. For example, the second fuel dryer 902 may include a grate 400 having openings (not shown) defined therethrough and configured to receive the second portion of fuel 122 thereon and disposed within a lower portion 251 of furnace 250 proximal the firing system 102. The second portion of fuel 122 is conveyed to the furnace 250 from sieve 116 and disposed on the grate 400 by a second conveyor 255, such as a conventional mechanical belt-type conveyor. In other embodiments, the second conveyor 255 may include a pressurized duct. During an operation of the furnace 250, while the second portion of fuel 122 is on grate 400, the second portion of fuel 122 is thereby exposed to heat and a reducing environment due to the combustion occurring in the furnace 250, as well as being fluidized by the oxygen deficient exhaust gas stream 272, whereby the second portion of fuel 122 is at least partially devolatilized and dried in a known manner. As will be appreciated, the second portion of fuel 122 disposed on the grate 400 defines a bed region 440, also referred to herein simply as a "bed", wherein fluidization occurs. For example, the bed region 440 may include one of a fixed bed, fluidized bed, a bubbling fluidized bed, or sluggish fluidized bed.

Figure 5:
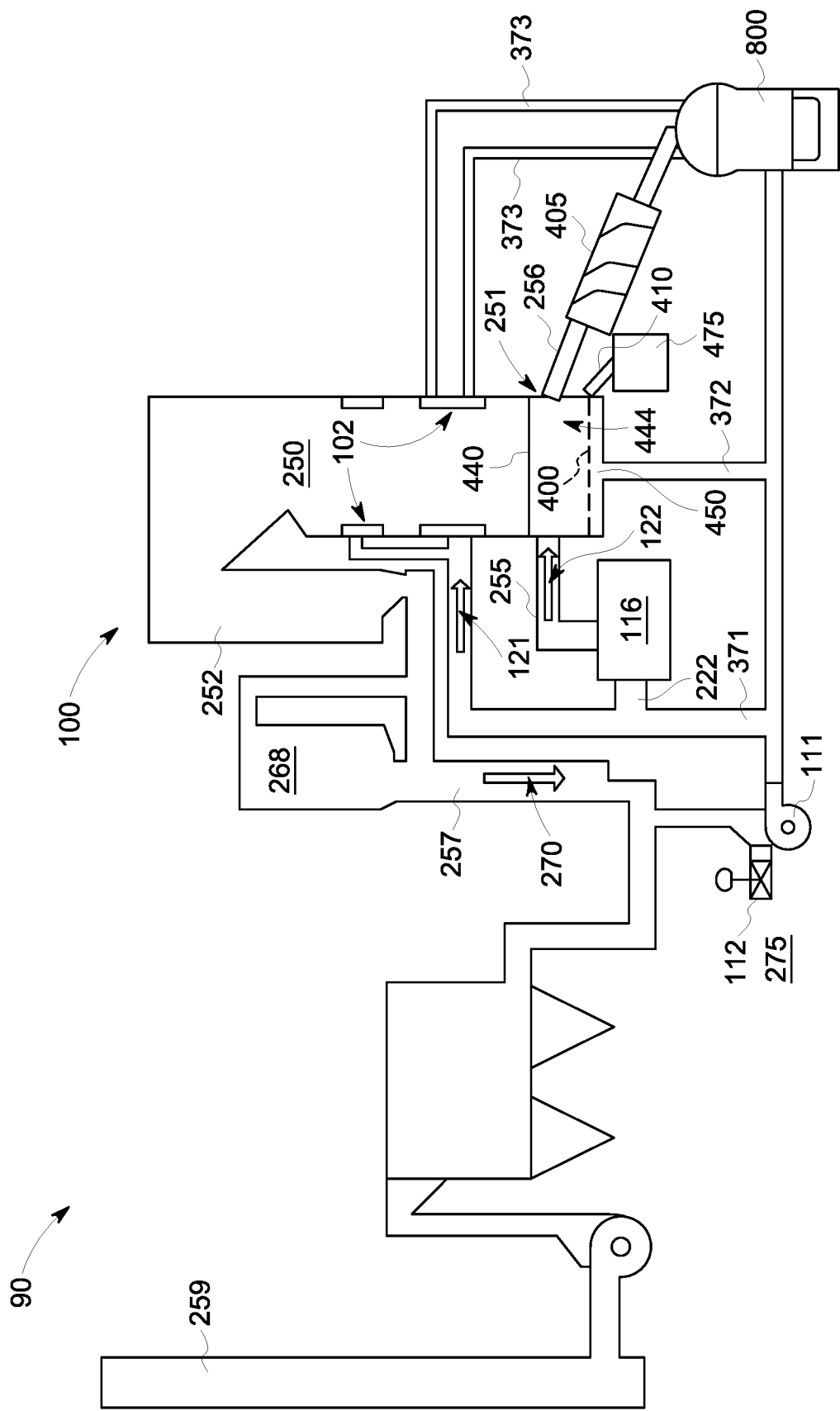
FIG. 5 is a schematic diagram of yet another alternative embodiment.

Additionally, ash particles produced by the combustion in furnace 250 and present in the bed region 440 may be separated from the second portion of fuel 122. For example, in some embodiments, such as depicted in FIG. 5, the fixed bed region 440 is coupled in fluid communication with an ash separator 444, whereby the relatively heavier ash particles in the second portion of fuel 122 migrate to the bottom of the bed region 440, and are captured for disposal in an ash receptacle 475 coupled via outlet 410 in fluid communication with the bottom of the bed region 440. Conversely, the relatively lighter ash and fuel particles within the second portion of fuel 122 may remain toward the upper part or top of the bed region 440 and provided therefrom to an ash cooler 405, such as a rotary ash cooler, prior to being conveyed to the mill 800. In an embodiment, a residence time of the bed region 440 (i.e., the period of time that the second portion of fuel 122 remains in the bed region 440 in furnace 250), may be based on a predetermined time period. In other embodiments, the residence time of the second portion of fuel 122 in bed 440 may be determined based on the desired properties of the second portion of fuel 122, such as a predetermined moisture content. When the desired properties of the second portion of fuel 122 are met, and/or when a predetermined residence time of the second portion of fuel 122 on grate 400 is met, the second portion of fuel 122 is then removed or extracted from bed 440.

In an embodiment, a second channel or duct 372 is arranged in fluid communication with the flue 257 and configured to receive a second portion 272 of the flue gas exiting the furnace 250 therethrough. The second portion of flue gas 272 is directed via the second duct 372 to the second fuel dryer 902 to fluidize the second portion of fuel 122 disposed in the bed 440. Some embodiments may include any number of second ducts 372 to convey the second portion of flue gas 272 to the second fuel dryer 902.

In an embodiment, the second portion of flue gas 272 may be provided to a plenum 450 disposed beneath and proximal to the grate 400. The second portion of flue gas 272 may be provided through second duct 372 using a fan such as the first air fan 111. In other embodiments, a second air fan (not shown) may be used in lieu of, or in conjunction with the first air fan 111.

In an embodiment, an additional gas 275, such as ambient air may be drawn in through a valve 112 or damper in cooperation with the first air fan 111, and added to the second portion of flue gas 272 to adjust or control the flowrate and oxygen content of the second portion of flue gas 272 delivered to fluidize the second portion of fuel 122 on the bed 440. In this way, the temperature, gas velocity, and chemical composition of the fluidizing gas (i.e., the second portion of flue gas 272) for the fuel (i.e., the second portion of fuel 122) above the grate 400 can be controlled.

When extracted from grate 400, the second portion of fuel 122 is then conveyed to a mill or pulverizer 800 to be milled (i.e., to mechanically reduce the particulate size of the fuel 122), and thereafter re-introduced into the furnace 250 to be combusted therein. The second portion of fuel 122 is conveyed out of the furnace 250 to the pulverizer by third conveyor 256, which may be a pressurized duct. In other embodiments, the third conveyor 256 may alternatively include a conventional mechanical belt-type conveyor, or a chute. In some embodiments, prior to conveyance from the furnace 250 to the pulverizer 800, the second portion of fuel 122 may be conveyed via the third conveyer 256 to a dryer device 284 (FIG. 4), such as a conventional carbon separator and/or a heat exchanger, for further optimization reduction) of moisture content and ash removal, prior to conveyance to, and sizing by, the pulverizer 800. Still other embodiments may omit the dryer device 284 and convey the second portion of fuel 122 via the third conveyor 256 directly from the furnace 250 to the pulverizer 800 to be milled. After milling in pulverizer 800, the second portion of fuel 122 is then conveyed to the furnace suspension firing system 102 to be burned.

In an embodiment, the second portion of fuel 122 may be conveyed from pulverizer 800 and provided to first duct 272 for conveyance, along with the first portion of fuel 121, to the firing system 102. In other embodiments, the second portion of fuel 122 may be conveyed from pulverizer 800 (i.e., outside of the furnace 250) via a fourth conveyor 373 to the firing system 102 (i.e., inside the furnace) separately from the first portion of fuel 121 in first duct 371. For example, in embodiments wherein the mill 800 may be a beater wheel type mill, the fourth conveyor 373 may include a pressurized channel or duct 373 arranged in fluid communication with the mill 800 to receive the second portion of fuel 122 therefrom utilizing the pressurized air blowing from the mill 800. In other embodiments the fourth conveyor 373 may include a fourth duct 373 in fluid communication with a fan (not shown) such as a conventional secondary air fan to pressurize the air in the fourth duct 373 to cooperatively convey the second portion of fuel 122 from the mill 800 through the fourth duct 373 to the firing system 102 in furnace 250. Still other embodiments may use any number of mechanical conveyors arranged to define the fourth conveyor 373 to convey the second portion of fuel 122 to the firing system 102 in the furnace 250. As depicted in FIG. 2, some embodiments may include a fourth conveyor 373 including any number of fourth ducts to convey the second portion of fuel 122 from the pulverizer 800 to the firing system 102.

Referring back to the system described in FIG. 1, the boiler 100 may be started as a conventional semi-suspension system. However, when the temperature of the furnace has reached a predetermined or desired level (for example, when the amount of heat input on the grate 400 can be reduced without detrimental effect on boiler performance), the second portion of the flue gas 272 is recirculated, and a devolatilization and a drying of the second portion of fuel 122 on grate 400 is initiated. The second portion of fuel 122 is then extracted from the furnace 250 with the preferred moisture content to be sized in pulverizer 800 (with a relatively low parasitic load due to the lower moisture content), and then re-injected in the furnace 250 through the suspension firing system 102. In this way, the heat input is shifted to the suspension firing system 102, thus giving more flexibility to quickly adjust to any change in load demand.

Figure 3:
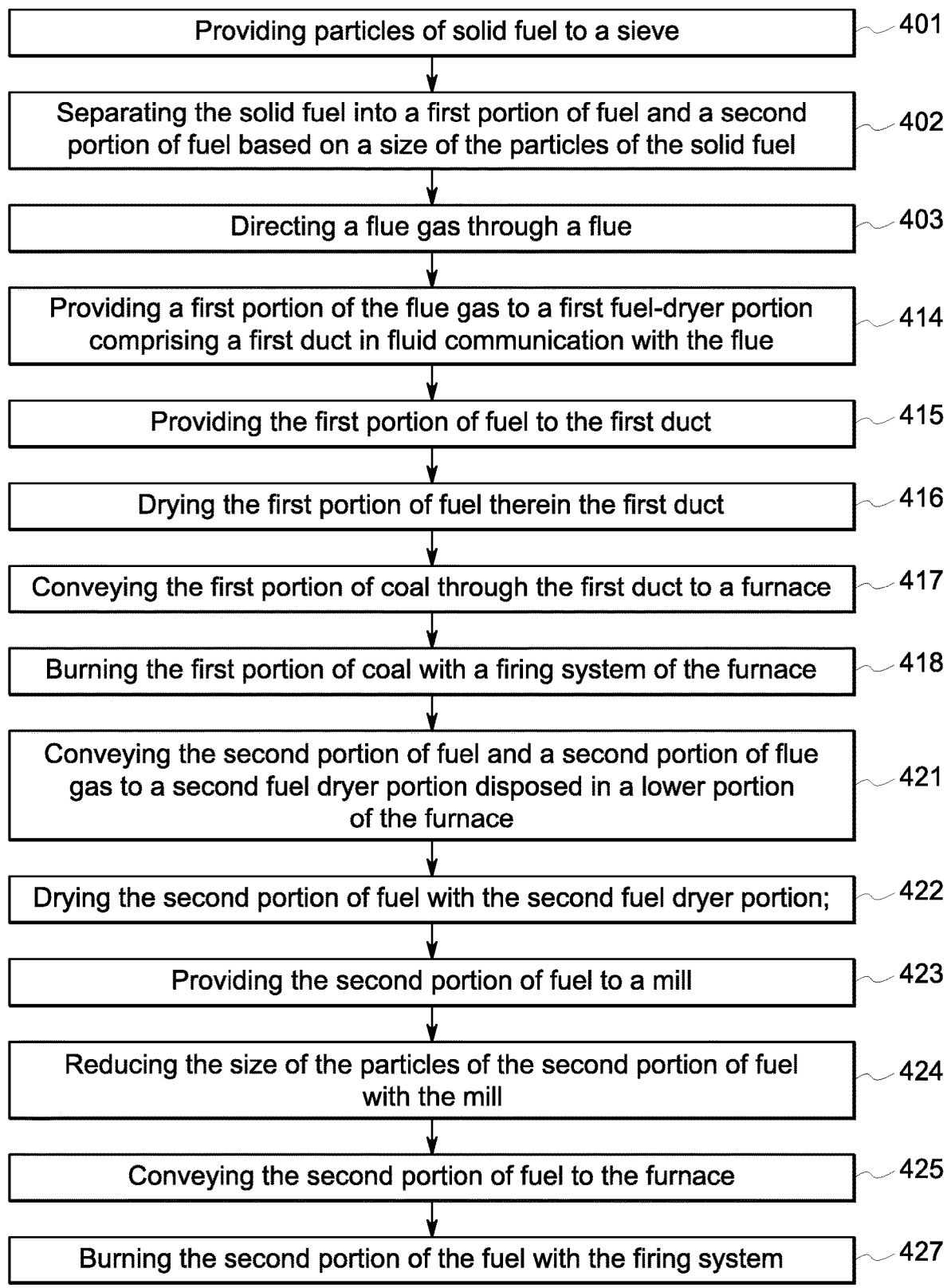
FIG. 3 is a flow diagram according an embodiment of a method.

Turning now to FIG. 3, in an embodiment, a method of operating a furnace having a firing system configured to combust particles of a solid fuel received therein, is provided. The method includes at step 401 providing the particles of solid fuel to a sieve, at step 402 separating the solid fuel into a first portion of fuel and a second portion of fuel based on a size of the particles of the solid fuel, wherein the size of the particles in the first portion of fuel are smaller than a predetermined size, and the size of the fuel particles in the second portion of fuel are larger than a predetermined size, at step 403 directing a flue gas through a flue, at step 414 providing a first portion of the flue gas to a first fuel-dryer including a first duct in fluid communication with the flue, at step 415 conveying the first portion of fuel to the first duct, at step 416 drying the first portion of fuel therein the first duct, at 417 conveying the first portion of fuel through the first duct to the furnace, and at 418 combusting the first portion of fuel with firing system. The method further includes at step 421 conveying the second portion of fuel to a second fuel dryer disposed within a lower portion of the furnace and conveying a second portion of the flue gas to the second fuel dryer portion, at 422 drying the second portion of fuel with the second fuel dryer portion, at step 423 conveying the second portion of fuel from the second fuel dryer portion within the furnace to a mill disposed outside of the furnace, at step 424 reducing the size of the particles of the second portion of fuel with the mill, at step 425 conveying the second portion of fuel from the mill to the furnace, and at step 427 combusting the second portion of fuel with firing system.

In the above described embodiments, the second portion of the fuel 122 is fed to the boiler 250 on the grate 400 and exposed to a reduced atmosphere, for a predetermined residence time with low gas velocity such that contaminant matter is released from the fuel 122. A technical effect of these embodiments is that biomass ash entrainment away from the grate 400 is limited by low gas velocities thus reducing the tendency for plugging or fouling downstream of the furnace 250.

A technical effect of the above described embodiments is that by re-circulating the flue gas, controlling the reducing environment in the lower section of the furnace, and suspension firing of dried fuel allows for a better control of NOx emissions.

Therefore, according to the claimed subject matter, the boiler includes a hybrid dryer with a residence time adapted to larger size, high moisture moist fuel particles. Using the hot flue gas to pre-dry the fuel prior to pulverizing enables the removal of moisture without requiring expensive heat transfer equipment such as conventional rotary and fluidized bed dryers.

Figure 6:
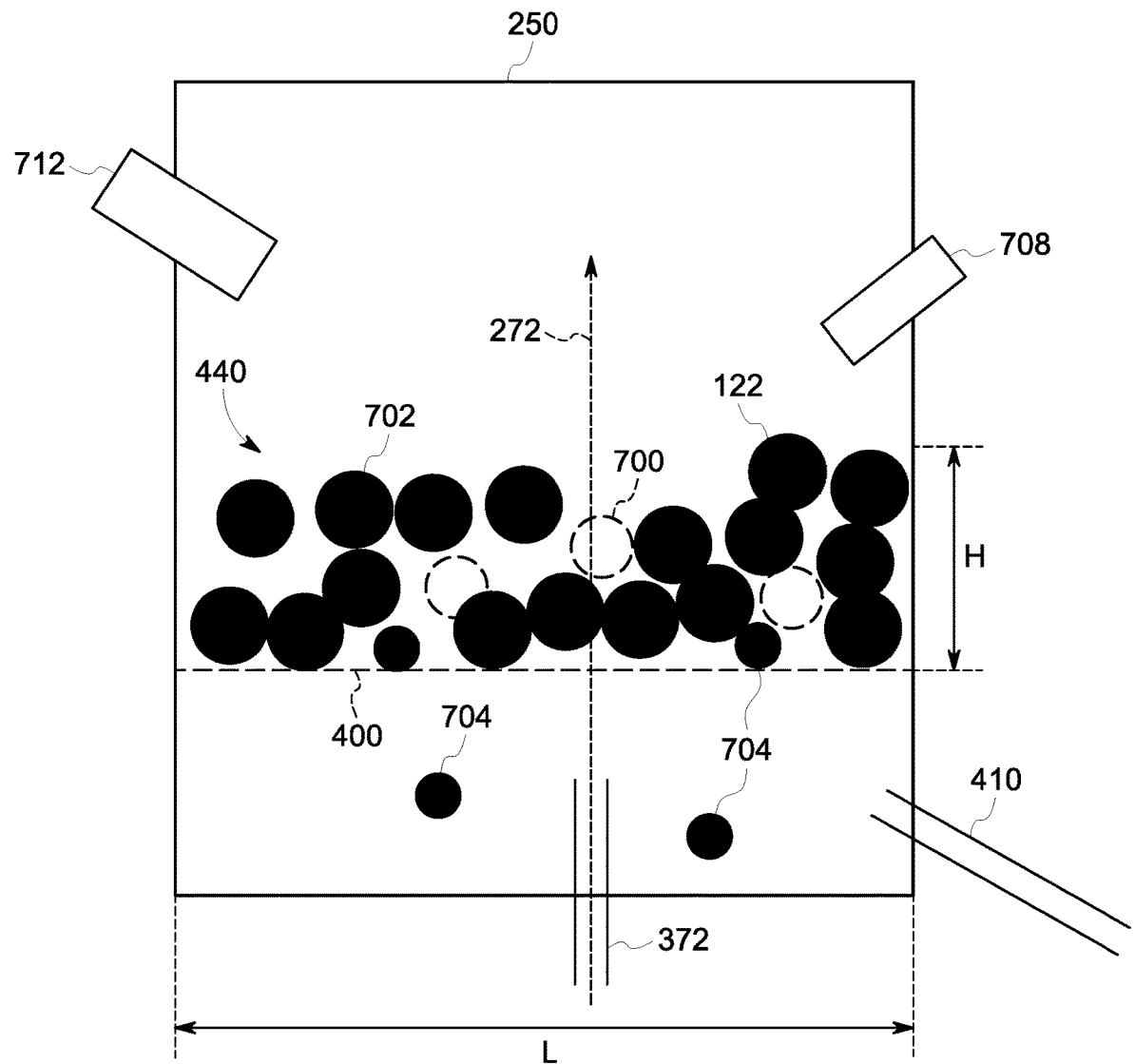
FIG. 6 is a schematic diagram of yet another embodiment.

Moving now to FIG. 6, as will be appreciated, in embodiments, the bed 440 formed on the grate 400 by a stream of the second fuel 122 may be operative to reduce emissions of the furnace 250 by facilitating the capture of contaminants (represented by dashed circles 700), e.g., NOx, SOx, one or more alkalis, one or more alkaline earth elements, other contaminant metals, and/or other elements and/or chemicals that may cause corrosion, fouling, slagging, greenhouse effects, acid rain or are otherwise desirable to prevent from being emitted into the atmosphere/environment. In such embodiments, the bed 440 may be fluidized by recycled flue gas, e.g., the second portion of the flue gas 272 via duct 372. As will be understood, as the fuel 122 travels across the bed 440, the heat from the furnace 250 and/or flue gas 272 cause the fuel 122 to generate char 702, ash 704 and the contaminants 700. In other words, the fuel 122 is partially gasified and combusted within the bed 440. By adjusting and/or controlling one or more properties of the bed 440, embodiments of the present invention facilitate the capture of the contaminants 700 by the ash 704, and in turn the char 702, i.e., the portion of the fuel 122 that is eventually fired in the furnace 250, has significantly less contaminants than the fuel 122 before entering the bed 440, or, in some embodiments, no contaminants.

For example, in embodiments, the one or more properties of the bed 440 may include: a flow rate of the flue gas 272 across the bed 440 which may range from about 0.05 ft/s to about 5.0 ft/s; an oxygen concentration of the flue gas 272 within the bed 440, which may range from about 0% volume to about 21% volume; a temperature of the flue gas 272 within the bed 440 which may range from about an ambient temperature, e.g., 70-80° F., to about 600° F.; a height H of the bed. 440 which may range from about 3 ft to about 60 ft; a length L of the bed 440 which may range from about 1 ft to about 500 ft; a width W (not shown as it is normal to the drawing sheet of FIG. 6) of the bed 440 which may range from about 10 ft to about 250 ft; a residence time, i.e., the amount of time the fuel 122 spends within the bed 440, which may range from about 1 s to about 2 hrs (depending on the fuel moisture and temperature content); and/or other properties of the bed 440 which effect the chemistry and/or stoichiometric conditions within the bed 440.

In some embodiments, the composition, i.e., the substances making up the bed 440 can be varied. For example, in embodiments, the furnace 250 may further include an injector/delivery device 708 that delivers/feeds additives to the bed 440 so as to change the chemical composition of the bed 440. Such additives may include limestone (to control sulfur emissions), clays (to capture alkalis), recycled fuel ash, lime, and/or any other sorbent capable of capturing contaminants.

Figure 7:
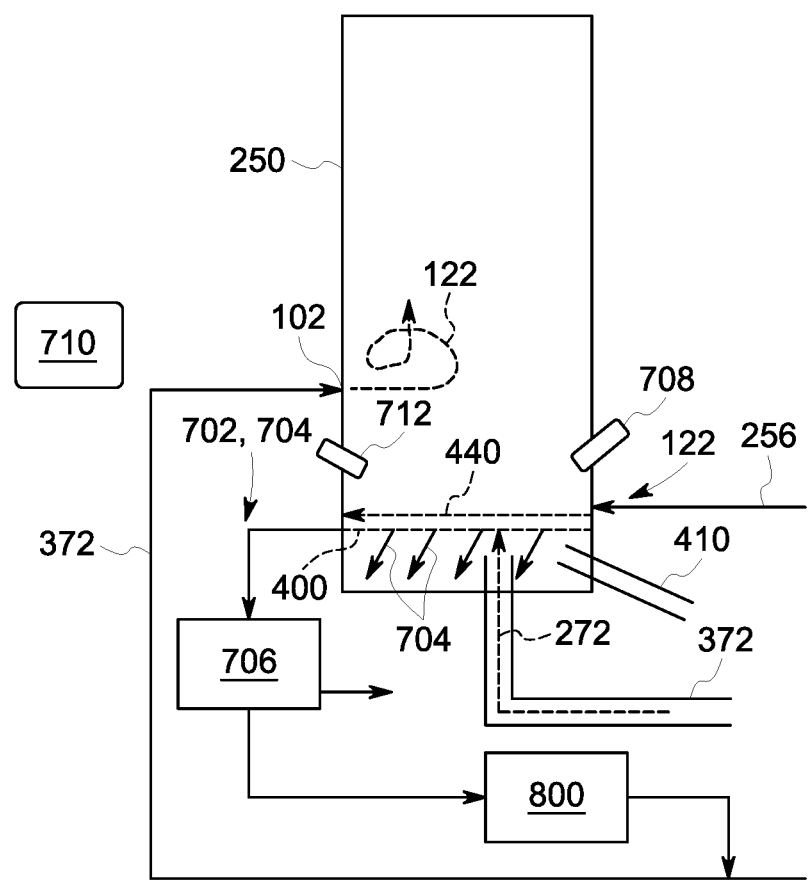
FIG. 7 is another schematic diagram of the embodiment of FIG. 6.

Turning to FIG. 7, in embodiments, the furnace 250 and/or the encompassing facility, e.g., power plant 90 (FIG. 1), may further include a carbon separator 706 disposed downstream of the bed 440 and operative to separate the char 702 from the ash 704 so that the char 702 can be fired in the furnace 250 and the ash 704 containing the contaminants can be disposed of and/or further processed.

In some embodiments, the grate 400 may function as a carbon separator by allowing the ash 704 to fall down from the bed 440, while retaining the char 702 within the bed 440, with the ash 704 moving to receptacle 475 (FIG. 5) via outlet 410.

As described above, after having been dried by the furnace 250, the char 702 may be sent to the mill 800 (FIG. 5) for processing before being fired in the furnace 250.

In embodiments, a controller 710 may monitor the chemistry of the bed 440 via one or more sensors 712 and adjust the properties of the bed 440, as discussed above, to optimize the capture of the contaminants 700 (FIG. 6).

Finally, it is also to be understood that the furnace 250, boiler 100 and/or encompassing power plant 90 may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein, which may be accomplished in real-time. For example, the controller 710 may include at least one processor and system memory/data storage structures, which may include random access memory (RAM) and read-only memory (ROM). The at least one processor of the controller 710 may include one or more conventional microprocessors and one or more supplementary co-processors such as math co-processors or the like. The data storage structures discussed herein may include an appropriate combination of magnetic, optical and/or semi-conductor memory, and may include, for example, RAM, ROM, flash drive, an optical disc such as a compact disc and/or a hard disk or drive.

Additionally, a software application that adapts the controller to perform the methods disclosed herein may be read into a main memory of the at least one processor from a computer-readable medium. The term "computer-readable medium," as used herein, refers to any medium that provides or participates in providing instructions to the at least one processor of the controller 710 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random-access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

While in embodiments, the execution of sequences of instructions in the software application causes at least one processor to perform the methods/processes described herein, hard-wired circuitry may be used in place of, or in combination with, software instructions for implementation of the methods/processes of the present invention. Therefore, embodiments of the present invention are not limited to any specific combination of hardware and/or software.

It is further to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

For example, in an embodiment, a method for reducing the emission of contaminants by a furnace is provided. The method includes forming a bed from a stream of fuel within the furnace; fluidizing the bed with flue gas from the furnace; and heating the fuel within the bed so as to generate char, ash and contaminants. The method further includes capturing the contaminants via the ash. In certain embodiments, the contaminants are NOx, SOx, one or more alkalis, and/or one or more alkaline earth elements. In certain embodiments, the method further includes adjusting at least one property of the bed. In certain embodiments, the at least one property is: a flow rate of the flue gas across the bed; an oxygen concentration of the flue gas within the bed; a temperature of the flue gas within the bed; a height of the bed; and/or a residence time of the bed. In certain embodiments, the at least one property is a flow rate of the flue gas across the bed and is adjusted to be within the range of about 0.05 ft/s to about 5.0 ft/s. In certain embodiments, the at least one property is a temperature of the flue gas within the bed and is adjusted to be within about 70° F. to about 600° F. In certain embodiments, the at least one property is a height of the bed and is adjusted to be between about 3 ft to about 60 ft. In certain embodiments, the at least one property is a residence time of the bed and is adjusted to be between about 1 s to about 2 hrs. In certain embodiments, the method further includes separating the char from the ash via a carbon separator.

Other embodiments provide for a furnace. The furnace includes a grate operative to form a bed from a stream of fuel, and a conduit operative to fluidize the bed with a flue gas generated by the furnace. The bed facilitates: generation of char, ash and contaminants from the fuel; and capture of the contaminants by the ash. In certain embodiments, the contaminants include NOx, SOx, one or more alkalis, and/or one or more alkaline earth elements. In certain embodiments, one or more properties of the bed are operative to maximize the capture of contaminants by the ash. In certain embodiments, the flue gas has a flow rate across the bed of about 0.05 ft/s to about 5 ft/s. In certain embodiments, a temperature of the flue gas within the bed is between about 70° F. to about 600° F. In certain embodiments, the bed has a height of between about 3 ft to about 5 ft. In certain embodiments, the bed has a residence time of between about 1 s to about 2 hrs. In certain embodiments, the furnace includes a delivery device that feeds an additive to the bed. In certain embodiments, the furnace further includes a carbon separator operative to separate the char from the ash. In certain embodiments, the furnace further includes a mill operative to processes the char.

Yet still other embodiments provide for a non-transitory computer readable medium including instructions. The instructions adapt at least one processor to: adjust at least one property of a bed formed by a stream of fuel within a furnace to facilitate: generation of char, ash and contaminants from the fuel; and capture of the contaminants by the ash.

Accordingly, as will be appreciated, by adjusting one or more properties of a fluidized bed of fuel disposed within a furnace as described above, some embodiments of the present invention may provide for improved emission reductions over traditional contaminant capture systems and approaches.

While the dimensions and types of materials described herein are intended to define the parameters of various embodiments, they are by no means limiting and are merely exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "above," "below," etc. are used merely as labels, and are not intended to impose numerical or positional requirements on their objects. Further, the limitations of the following claims are not written in means-plus-function format and are not intended to be interpreted as such, unless and until such claim limitations expressly use the phrase "means for" followed by a statement of function void of further structure.

This written description uses examples to disclose several embodiments of the invention, including the best mode, and to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A method for reducing the emission of contaminants by a
furnace having a firing system to combust fuel, the method comprising:
supplying a stream of fuel to the furnace, wherein the stream of fuel comprises a first portion of fuel of relatively fine particle sizes and a second portion of fuel of relatively coarse particle sizes;

separating the stream of fuel into a stream of fuel of relatively fine particle sizes and a stream of fuel of relatively coarse particle sizes before entering the furnace;

providing the stream of fuel of relatively fine particle sizes to the firing system for combustion thereof;

forming a bed from only the stream of fuel of relatively coarse particle sizes within the furnace, wherein the bed is in a lower portion of the furnace proximal the firing system;

fluidizing the bed formed from the stream of fuel of relatively coarse particle sizes with flue gas from the combustion of the stream of fuel of relatively fine particle sizes in the firing system of the furnace;

heating the stream of fuel of relatively coarse particle sizes within the bed so as to generate char, ash and contaminants;

capturing the contaminants via the ash;

conveying the heated stream of fuel of relatively coarse particle sizes from the bed outside of the furnace to a pulverizer for milling to form pulverized fuel of relatively fine particle sizes; and providing the pulverized fuel of relatively fine particle sizes to the firing system for combustion thereof.

2. The method of claim 1, wherein the contaminants are NOx, SOx, one or more alkalis, and/or one or more alkaline earth elements.

3. The method of claim 1, further comprising:
adjusting at least one property of the bed.

4. The method of claim 3, wherein the at least one property is:
a flow rate of the flue gas across the bed;
an oxygen concentration of the flue gas within the bed;
a temperature of the flue gas within the bed;
a height of the bed;
a chemical composition of the bed; and/or
a residence time of the bed.

5. The method of claim 3, wherein the at least one property is a flow rate of the flue gas across the bed and is adjusted to be within the range of about 0.05 ft/s to about 5 ft/s.

6. The method of claim 3, wherein the at least one property is a temperature of the flue gas within the bed and is adjusted to be within about 70° F. to about 600° F.

7. The method of claim 3, wherein the at least one property is a height of the bed and is adjusted to be between about 3 ft to about 60 ft.

8. The method of claim 3, wherein the at least one property is a residence time of the bed and is adjusted to be between about 1 s to about 2 hrs.

9. The method of claim 1, further comprising:
separating the char from the ash via a carbon separator.

10. A furnace, comprising:
a first inlet operative to receive a stream of fuel of relatively fine particle sizes;
a second inlet operative to receive a stream of fuel of relatively coarse particle sizes;
a firing system to combust fuel, wherein the firing system is operative to receive the stream of fuel of relatively fine particle sizes for combustion thereof;
a grate operative to form a bed from only the stream of fuel of relatively coarse particle sizes;
a first conduit operative to fluidize the bed formed from the stream of fuel of relatively coarse particle sizes with a flue gas generated by the combustion of the stream of fuel of relatively fine particle sizes in the firing system, wherein heat from the firing system and/or the flue gas causes the stream of fuel of relatively coarse particle sizes within the bed formed on the grate to generate char, ash and contaminants, and wherein the grate captures the contaminants by the ash; and
a second conduit operative to convey the heated stream of fuel of relatively coarse particle sizes from the bed formed on the grate outside of the furnace.

11. The furnace of claim 10, wherein the contaminants comprise:
NOx, SOx, one or more alkalis, and/or one or more alkaline earth elements.

12. The furnace of claim 10, wherein the bed comprises one or more properties operative to maximize the capture of contaminants by the ash.

13. The furnace of claim 10, wherein the flue gas has a flow rate across the bed of about 0.05 ft/s to about 5 ft/s.

14. The furnace of claim 10, wherein a temperature of the flue gas within the bed is between about 70° F. to about 600° F.

15. The furnace of claim 10, wherein the bed has a height of between about 3 ft to about 60 ft.

16. The furnace of claim 10, wherein the bed has a residence time of between about 1 s to about 2 hrs.

17. The furnace of claim 10, further comprising:
a delivery device that feeds an additive to the bed.

18. The furnace of claim 10, further comprising:
a carbon separator operative to separate the char from the ash.

19. The furnace of claim 10, further comprising:
a mill operative to process one or more of the char and the heated stream of fuel of relatively coarse particle sizes carried by the second conduit.

20. A non-transitory computer readable medium comprising instructions that adapt at least one processor to:
adjust at least one property of a bed formed by only a stream of fuel of relatively coarse particle sizes within a lower portion of a furnace having a firing system that is proximal to the bed, the firing system operable to receive a stream of fuel of relatively fine particle sizes for combustion thereof, wherein the bed is fluidized by flue gas generated from the combustion of the stream of fuel of relatively fine particle sizes in the firing system, the adjusting of the at least one property of the bed formed by only the stream of fuel of relatively coarse particle sizes facilitates:
generation of char, ash and contaminants from the stream of fuel of relatively coarse particle sizes; and
capture of the contaminants by the ash.

* * * * *